United States Patent
Jordan et al.

(10) Patent No.: US 12,431,023 B2
(45) Date of Patent: Sep. 30, 2025

(54) SYSTEM AND METHOD FOR RENDERING CONTENT ON A VEHICLE

(75) Inventors: Michael Conrad Jordan, San Francisco, CA (US); Neville Boston, San Jose, CA (US)

(73) Assignee: REVIVERMX, INC., Granite Bay, CA (US)

( * ) Notice: Subject to any disclaimer, the term of this patent is extended or adjusted under 35 U.S.C. 154(b) by 907 days.

(21) Appl. No.: 13/538,884

(22) Filed: Jun. 29, 2012

(65) Prior Publication Data

US 2013/0006775 A1 Jan. 3, 2013

Related U.S. Application Data

(60) Provisional application No. 61/502,474, filed on Jun. 29, 2011.

(51) Int. Cl.
*G06Q 30/02* (2023.01)
*G06Q 30/0251* (2023.01)
*G08G 1/00* (2006.01)

(52) U.S. Cl.
CPC .......... *G08G 1/20* (2013.01); *G06Q 30/0265* (2013.01)

(58) Field of Classification Search
None
See application file for complete search history.

(56) References Cited

U.S. PATENT DOCUMENTS

| | | | |
|---|---|---|---|
| 4,001,822 A | 1/1977 | Sterzer | |
| 4,928,084 A | 5/1990 | Reiser | |
| 5,105,179 A | 4/1992 | Smith | |
| 5,132,666 A | 7/1992 | Fahs | |

(Continued)

FOREIGN PATENT DOCUMENTS

TW 200910285 A * 3/2009 ........... B60Q 1/2611

OTHER PUBLICATIONS

Author(s):Ha, Louisa Title: Integrated model of adveritsing clutter Journal: Taylor and Francis [online]. Publication date: 2008. [retrieved on: May 31, 2023 ]. Retrieved from the Internet: < URL: https://www.tandfonline.com/doi/epdf/10.2501/S0265048708080153 ?needAccess=true&role=button> (Year: 2008) (Year: 2008).*

(Continued)

*Primary Examiner* — David J Stoltenberg
(74) *Attorney, Agent, or Firm* — Innovent Law P.C.; Karima Gulick

(57) ABSTRACT

One variation of a preferred system for rendering content on a vehicle includes a display, a memory, a communication module, and a processor. The display is configured to mount adjacent an exterior surface of a vehicle. The memory is configured to store a plurality of executable applications including a vehicle identification application and an application elected by a user. The communication module is configured to download the user-elected application to the memory. The processor is configured to selectively execute applications to control visual content rendered on the display, wherein the display renders vehicle identification information when the vehicle identification application executes, and wherein the display renders additional visual content when the user-elected application executes.

22 Claims, 6 Drawing Sheets

(56) References Cited

U.S. PATENT DOCUMENTS

| | | | |
|---|---|---|---|
| 5,310,999 A * | 5/1994 | Claus | G01S 13/751 235/384 |
| 5,396,233 A | 3/1995 | Hofmann | |
| 5,422,624 A | 6/1995 | Smith | |
| 5,533,045 A | 7/1996 | Hasegawa et al. | |
| 5,608,391 A | 3/1997 | Bantli et al. | |
| 5,621,571 A | 4/1997 | Bantli et al. | |
| 5,627,549 A | 5/1997 | Park | |
| 5,657,008 A | 8/1997 | Bantli | |
| 5,717,374 A | 2/1998 | Smith | |
| 5,747,938 A | 5/1998 | Beard | |
| 5,873,068 A | 2/1999 | Beaumont et al. | |
| 5,937,392 A | 8/1999 | Alberts | |
| 5,963,129 A | 10/1999 | Warner | |
| 6,026,060 A | 2/2000 | Rothschild et al. | |
| 6,052,068 A | 4/2000 | Price R-W et al. | |
| 6,067,008 A | 5/2000 | Smith | |
| 6,108,954 A | 8/2000 | Eiteneer et al. | |
| 6,239,757 B1 | 5/2001 | Ishikawa et al. | |
| 6,252,523 B1 * | 6/2001 | Mostrom | H04M 15/81 340/928 |
| 6,253,143 B1 | 6/2001 | Silvernagle et al. | |
| 6,404,327 B1 | 6/2002 | Naddeo | |
| 6,553,131 B1 | 4/2003 | Neubauer et al. | |
| 6,608,556 B2 | 8/2003 | De Moerloose et al. | |
| 6,641,038 B2 | 11/2003 | Gehlot et al. | |
| 6,701,143 B1 | 3/2004 | Dukach et al. | |
| 6,731,238 B2 | 5/2004 | Johnson | |
| 6,741,920 B1 | 5/2004 | Otto | |
| 6,812,851 B1 | 11/2004 | Dukach et al. | |
| 6,850,209 B2 | 2/2005 | Mankins et al. | |
| 6,864,784 B1 | 3/2005 | Loeb | |
| 6,866,191 B2 | 3/2005 | Messina | |
| 6,914,540 B2 | 7/2005 | Gongolas | |
| 6,922,138 B2 | 7/2005 | Melvin | |
| 7,027,772 B2 | 4/2006 | Chen et al. | |
| 7,076,244 B2 | 7/2006 | Lazaridis et al. | |
| 7,096,102 B1 | 8/2006 | Parker, Sr. | |
| 7,142,104 B1 | 11/2006 | Blueford | |
| 7,154,383 B2 | 12/2006 | Berquist | |
| 7,161,563 B2 | 1/2007 | Vitale et al. | |
| 7,319,379 B1 | 1/2008 | Melvin | |
| 7,426,480 B2 | 9/2008 | Granger et al. | |
| 7,430,822 B1 | 10/2008 | Combs | |
| 7,449,998 B1 | 11/2008 | Au et al. | |
| 7,466,241 B2 | 12/2008 | Lyle et al. | |
| 7,478,492 B2 | 1/2009 | Madonia | |
| 7,482,910 B2 | 1/2009 | Melvin | |
| 7,536,189 B2 | 5/2009 | Himmelstein | |
| 7,551,088 B2 | 6/2009 | Findlay et al. | |
| 7,565,141 B2 | 7/2009 | Macaluso | |
| 7,595,740 B2 | 9/2009 | Pechenick et al. | |
| 7,696,864 B2 | 4/2010 | Dillon | |
| 8,188,850 B2 | 5/2012 | Smith | |
| 8,515,126 B1 * | 8/2013 | Medasani | G06F 18/2111 382/103 |
| 8,527,338 B2 * | 9/2013 | Lin | G06Q 30/02 345/1.3 |
| 9,691,061 B2 * | 6/2017 | Deitiker | G07B 15/063 |
| 2001/0001319 A1 | 5/2001 | Beckert et al. | |
| 2002/0021210 A1 | 2/2002 | Naddeo | |
| 2002/0097193 A1 | 7/2002 | Powers | |
| 2003/0034934 A1 | 2/2003 | Brewer | |
| 2003/0140536 A1 | 7/2003 | Bilyeu | |
| 2003/0142044 A1 | 7/2003 | Berry | |
| 2004/0021579 A1 * | 2/2004 | Oursler et al. | 340/870.07 |
| 2004/0128891 A1 | 7/2004 | Keach | |
| 2004/0230480 A1 * | 11/2004 | Kanayama | 705/13 |
| 2005/0271280 A1 * | 12/2005 | Farmer | G06V 40/10 382/104 |
| 2006/0082470 A1 * | 4/2006 | Zhu | G07B 15/063 340/928 |
| 2006/0142933 A1 | 6/2006 | Feng | |
| 2006/0213100 A1 | 9/2006 | Mccann | |
| 2006/0227010 A1 | 10/2006 | Berstis et al. | |
| 2007/0008084 A1 | 1/2007 | Wu et al. | |
| 2007/0038353 A1 | 2/2007 | Larschan et al. | |
| 2007/0046499 A1 | 3/2007 | McKenna | |
| 2007/0277412 A1 * | 12/2007 | Haubert | G09F 21/049 40/591 |
| 2007/0285361 A1 | 12/2007 | Jovanovich | |
| 2008/0059299 A1 | 3/2008 | Hamoui | |
| 2008/0258938 A1 | 10/2008 | Moon | |
| 2009/0299857 A1 * | 12/2009 | Brubaker | 705/14.66 |
| 2010/0259058 A1 * | 10/2010 | Knighton et al. | 296/24.39 |
| 2010/0286906 A1 | 11/2010 | Nogawa et al. | |
| 2011/0078933 A1 | 4/2011 | Lukawitz et al. | |
| 2011/0161160 A1 * | 6/2011 | Carlson | G16B 30/00 705/14.41 |
| 2011/0170744 A1 * | 7/2011 | Malinovskiy | G06K 9/00785 382/103 |
| 2011/0291822 A1 | 12/2011 | Boston et al. | |
| 2012/0056982 A1 * | 3/2012 | Katz | G06F 3/0304 348/43 |
| 2012/0215594 A1 * | 8/2012 | Gravelle | G07B 15/02 705/13 |
| 2015/0039365 A1 | 2/2015 | Haque | |

OTHER PUBLICATIONS

Author(s):Ha, Louisa Title: Integrated model of adveritsing clutter Journal:ACM [online]. Publication date: 2009.[retrieved on: Sep. 27, 2023 ]. Retrieved from the Internet: < URL: https://dl.acm.org/doi/pdf/10.1145/1658939.1658951> (Year: 2009) (Year: 2009).*

Author(s):Dennis Title: digital signage in mall atmosphere Journal: Elsevier [online]. Pub: 2010.[retrieved on: Jan. 23, 2024 ]. Retrieved from the Internet: < URL: https://www.sciencedirect.com/science/article/pii/S096969891000024X> (Year: 2010) (Year: 2010).*

Author(s):Lee, U Title: fleanet Journal:Elsevier [online]. Pub: 2009. [retrieved on: Aug. 2, 2024 ]. Retrieved from the Internet: < URL: https://ieeexplore.ieee.org/stamp/stamp.jsp?arnumber=5223624&casa_token=Qat7mdP_ad0AAAAA:WV25lynNdOjuE964EwS2YUBFQ1_orZW61RDP1-n> (Year: 2010) (Year: 2009).*

A::Sousa Title: using eye tracking Journal:Academia [online]. Pub: 2013. [retrieved on: Dec. 11, 2024 ]. Retrieved from the Internet: < URL: https://d1wqtxts1xzle7.cloudfront.net/41186919/0f3175341929f8094b000000.pdf20160115-19908-wtusos-libre.pdf?1452854477=&response-content-disposition=inline%3B> (Year: 2013).*

* cited by examiner

SYSTEM AND METHOD FOR RENDERING CONTENT ON A VEHICLE

CROSS-REFERENCE TO RELATED APPLICATIONS

The Application claims the benefit of U.S. Provisional Application No. 61/502,474, filed 29 Jul. 2011, which is incorporated in its entirety by this reference.

This Application is related to U.S. patent application Ser. No. 13/117,089, filed on 26 May 2011, and U.S. patent application Ser. No. 13/117,093, filed on 26 May 2011, both of which are incorporated in their entirety by this reference.

TECHNICAL FIELD

This invention relates generally to the field of telematics, and more specifically to a new and useful method and system for rendering content on a vehicle in the field of telematics.

BACKGROUND

Commercial and passenger road, offroad, rail, water, and air vehicles are typically assigned unique government-issued identification numbers. This identification information is typically displayed on an exterior surface of a vehicle, such as on a stamped license plate mounted on a trunk lid or with a decal adhered to a fuselage. This identification information can then be used by law enforcement, port officials, air traffic control, private individuals, toll booths, weigh stations, a department of motor vehicles, or any other entity to identify the vehicle. However, this identification information is typically displayed in static form and cannot be modified in situ to broadcast additional or different information. Thus, there is a need in the field of telematics to create a new and useful system and method for rendering content on a vehicle.

DESCRIPTION OF THE PREFERRED EMBODIMENTS

The following description of the preferred embodiment of the invention is not intended to limit the invention to these preferred embodiments, but rather to enable any person skilled in the art to make and use this invention.

1. Preferred System

Figure 1:
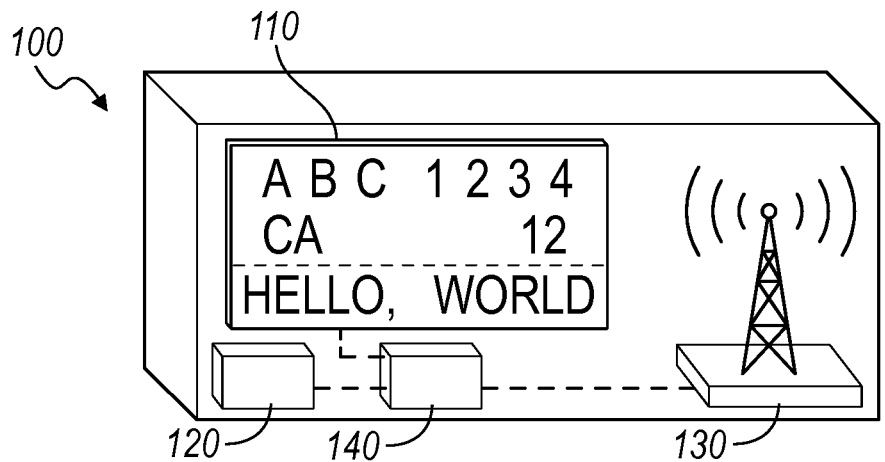
FIG. 1 is a schematic representation of a system of a preferred embodiment.

As shown in FIG. 1, a preferred system 100 for rendering content on a vehicle includes a display 110, a memory 120, a communication module 130, and a processor 140. The display 110 is configured to mount adjacent an exterior surface of a vehicle. The memory 120 is configured to store a plurality of executable applications including a vehicle identification application and an application elected by a user. The communication module 130 is configured to download the user-elected application to the memory 120. The processor 140 is configured to selectively execute applications to control visual content rendered on the display 110, wherein the display 110 renders vehicle identification information when the vehicle identification application executes, and wherein the display 110 renders additional visual content when the user-elected application executes.

Figure 2:
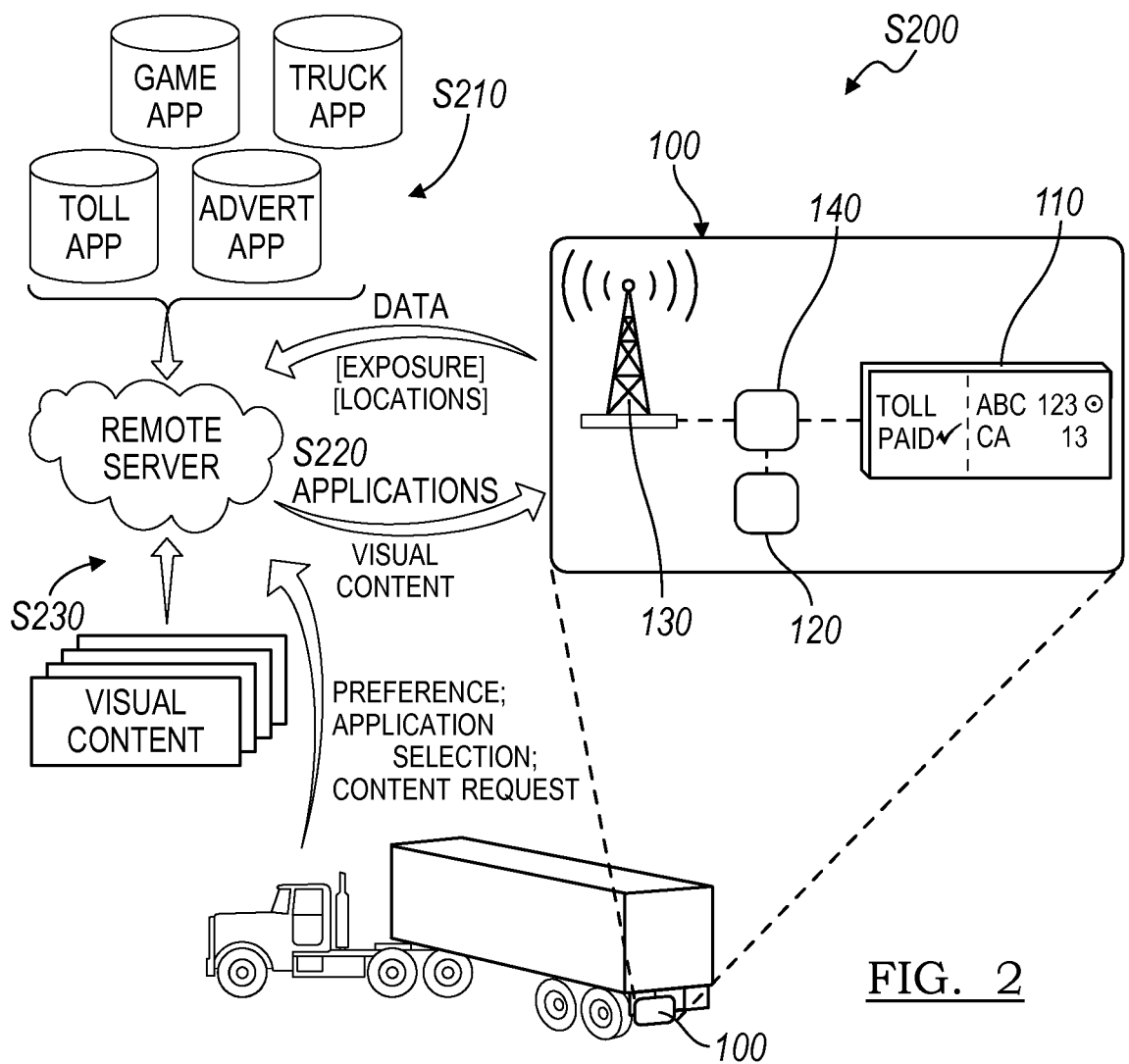
FIG. 2 is a flowchart representation of one variation of a second method of a preferred embodiment and a schematic representation of the preferred system.

The preferred system 100 preferably functions to execute a plurality of applications, wherein the display 110 renders visual content specific to each application for viewing from outside a vehicle. When executing a vehicle identification application, the preferred system 100 preferably functions as a digital license plate by displaying a government-issued license plate number of the vehicle. However, when executing another (i.e. a user-elected) application, the preferred system 100 preferably functions as a toll payment, interstate trucking, messaging, advertising, gaming, news, alert, or other application by displaying visual content relevant or specific to the user-elected application. The vehicle identification application is preferably a default and/or preloaded application executable on the preferred system 100, and additional applications are preferably elected by the user. As shown in FIG. 2, the additional or user-elected applications are preferably downloaded from a remote server containing a plurality of available applications executable on the preferred system 100 such that the user can customize the preferred system 100 to perform certain functions and/or to display certain visual content, types of visual content, forms of visual content, etc. The preferred system 100 can then switch between displaying vehicle identification information and displaying additional visual content, types of visual content, forms of visual content, etc. specific to the user-elected application. The user can therefore select various applications from a set of available applications to enable certain functionalities of the preferred system 100.

Figure 6A:
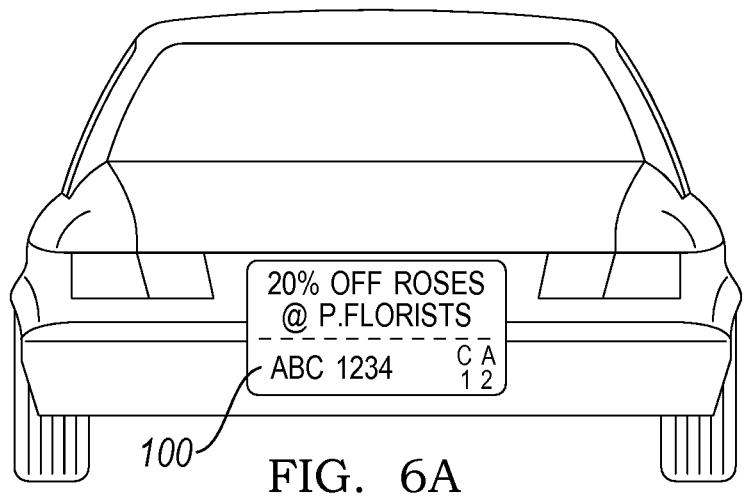
FIGS. 6A-6C are schematic representations in accordance with the preferred system.
Figure 6B:
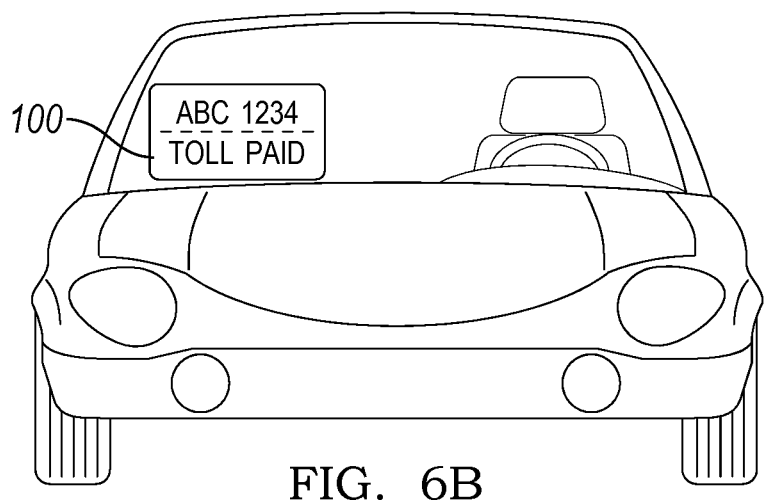
Figure 6C:
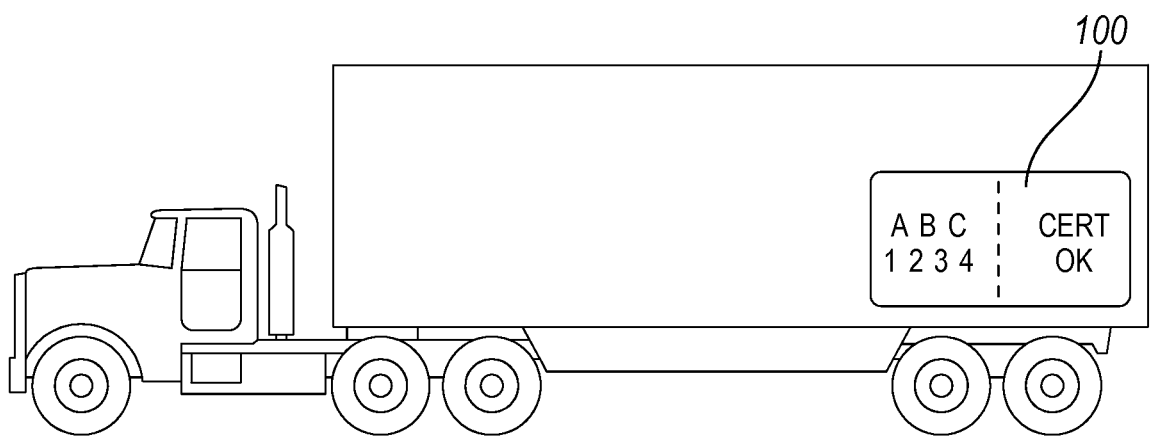

As shown in FIGS. 6A-6C, the preferred system 100 is preferably arranged on a road vehicle, such as a car, a truck, a motorcycle, a motorized scooter, a recreational vehicle (RV), a road tractor, a trailer, or a combine. However, the preferred system 100 can also be installed on any other type of vehicle, such as a boat, a jet ski, an airplane, a snowmobile, a glider, a hot air balloon, a helicopter, a bicycle, a farming implement, or any other suitable type of towed, manually-powered, or motorized vehicle. The user is preferably a driver of the vehicle, though the user can alternatively be another occupant of the vehicle, a pilot of the vehicle, a fleet manager of a vehicle fleet including the vehicle, a law enforcement officer, a government agent, representative, or employee, an individual outside of or following the vehicle, or any other suitable individual.

The display 110 of the preferred system 100 is configured to mount adjacent an exterior surface of a vehicle. The display 110 is further configured to render vehicle identification information when the vehicle identification application executes and to render the additional visual content when the user-elected application executes. The display 110 preferably renders or otherwise visually displays the vehicle identification information and the additional visual content. In one variation of the preferred system 100, the display 110 defines a single content region in which only one of the vehicle identification information and the additional visual content is rendered. However, in another variation of the preferred system 100, the display 110 defines multiple content regions such that the vehicle identification information and one or more additional visual contents can be rendered simultaneously. For example, the display 110 can define a primary content region and an auxiliary content region that is smaller in area than that primary content region, wherein the primary content region renders visual content of the user-elected application and the auxiliary content region renders the vehicle identification information when the user-elected application executes.

The display 110 is preferably a self-contained digital display, such as a light-emitting diode (LED) display, an electroluminescent display (ELD), electronic paper or e-ink, a plasma display panel (PDP), a liquid crystal display (LCD), a high-performance addressing display (HPA), a thin-film transistor display (TFT), an organic light-emitting diode (OLED) display, a reflective display, a microelectromechanical systems (MEMS) display, a surface-conduction electron-emitter display (SED), or interferometric modulator display (IMOD). The display 110 is also preferably backlit to enable legible viewing at night. Alternatively, the display 110 can be a projector configured to project visual content across an exterior surface or window of the vehicle, a projector configured to project visual content across the ground or another surface external to the vehicle, or any other suitable type of display or display device. The display 110 further preferably operates in various power consumption modes based upon the level of ambient light in order to minimize energy consumption without substantially sacrificing legibility of visual content rendered on the display 110.

The display 110 is preferably of a form and dimensions substantially similar to those of current government-issued license plates such that the display 100 can mount to an existing license plate bracket, mount, feature, or fastener on an exterior surface of the vehicle, as shown in FIGS. 2 and 6A. However, the display 110 can be of any other form or dimensions and can mount or be coupled to any other exterior surface of the vehicle, such as the side of a tractor trailer, as shown in FIG. 6C. Alternatively, the display 110 can be partially or wholly arranged within the vehicle, such as on an interior rear window ledge or on a dashboard of the vehicle, as shown in FIG. 6B. Furthermore, the display 110 is preferably arranged within a housing that also contains the memory 120, the communication module 130, and the processor 140. However, the display 110 can be arranged on or within the vehicle in any other way.

The memory 120 of the preferred system 100 is configured to store executable applications, including the vehicle identification application and the application elected by the user. The memory 120 can preferably store additional user-elected applications, application-specific or application-related data (e.g., vehicle identification information, toll payment information, a user-defined personal message), user preferences (e.g., fonts, visual content types, power settings), or any other relevant information pertaining to the operation of the preferred system 100. In one variation of the preferred system 100, the memory 120 is preloaded with the vehicle identification application and vehicle identification information (e.g., a license plate number) that is unique to the vehicle and/or to the preferred system 100. In this variation, the vehicle identification information is preferably unalterable.

The memory 120 is preferably in communication with the processor 140 such that the processor 140 can access application data and visual content from the memory 120, execute the application, and push visual content from the memory 120 to the display 110 for rendering. The memory 120 is preferably physically coupled to the processor 140 and arranged within a housing shared with the display 110 and the processor 140. Alternatively, the memory 120 can be arranged within the vehicle and remote from the display 110, such as adjacent or physically coextensive with an electronic control module (ECM) integrated into the vehicle. The memory 120 can alternatively be a remote memory coupled to a remote server, wherein the processor 140 accesses the remote memory via the communication module 130 in communication with the remote server. The memory 120 can alternatively be physically coextensive with memory incorporated into a mobile electronic device carried by the user, such at a smartphone or tablet. However, the memory 120 can be arranged in any other way relative to the display 110, and the memory 120 can be accessed over a wire, via wireless communication (e.g., Wi-Fi, cellular, Bluetooth, RFID), and/or through the communication module 130 in any other way or according to any other protocol.

The communication module 130 of the preferred system 100 is configured to download the user-elected application to the memory 120, as shown in FIG. 2. The communication module 130 is therefore preferably directly coupled to the memory 120, though the communication module 130 can alternatively be indirectly coupled to the memory 120, such as through the processor 140, as shown in FIG. 1. The communication module 130 is also preferably at least partially contained within the housing that also contains the processor 140, the memory 120, and the display 110. However, the communication module 130 can be arranged within the preferred system 100 and/or coupled to the memory 120 in any other way.

The communication module 130 preferably accesses a remote server that stores a plurality of applications, wherein each application on the remote server can be selected by the user and subsequently downloaded to, uploaded to, installed on, or executed on the preferred system 100 to enable a particular function defined by each application, as shown in FIG. 2. In one variation of the preferred system 100, the remote server functions as an application store through which the user can access or buy applications for the preferred system 100, wherein the processor 140 accesses the remote server through the communication module 130 to download an application selected by the user. In this variation, personal user information and/or vehicle identification information is preferably used to automatically bill the user, a fleet manager, or any other entity associated with the vehicle for the purchase of the elected application.

In one variation of the preferred system 100, the communication module 130 communicates directly with a remote server via a wireless communication protocol. In an example implementation, the communication module 130 communicates with the remote server over a cellular (e.g., 4G cellular) network and downloads the user-elected application over the cellular network. However, the communication module 130 can wirelessly communicate substantially directly with the remote server, such over Wi-Fi and a local area network connection, Bluetooth, satellite, or any other suitable type of short- or long-range wireless communication protocol.

In another variation of the preferred system 100, the communication module 130 communicates with the remote server through a wireless-enabled mobile device. In one example implementation, the communication module 130 includes a port configured to accept a physical wire connecting the preferred system 100 to a smartphone carried by the user, wherein the smartphone wirelessly accesses and pulls information from the remote server and subsequently uploads the information to the preferred system 100 via the wired connection. In another example implementation, the communication module 130 communicates with a tablet computer over short-range wireless communication protocol (e.g., Wi-Fi, Bluetooth, RFID, near field communication (NFC), infrared), wherein the tablet computer communicates with the remote server via long-range wireless communication protocol (e.g., cellular, satellite) to transfer information from the remote server to the communication module 130. In theses example implementations, the communication module 130 preferably receives application-related data from the mobile electronic device substantially in real time. Alternatively, the communication module 130 can receive application-related data substantially long after the mobile electronic device accesses and stores the application-related data locally. However, the communication module 130 can access and download user-elected application data and related visual content via any other communication protocol, through any other secondary or mobile electronic device, or in any other way.

The communication module 130 is preferably configured to receive data from the remote server, including the user-elected application, application-related data, and additional visual content. However, the communication module 130 can also transmit data from the preferred system 100 to the remote server, such as vehicle location data, visual content exposure (e.g., how long visual content is rendered on the display 110, how many individuals read or noticed the visual content), a user preference, vehicle or vehicle occupant identification information, a local person, vehicle, or environmental condition, or any other relevant data or information. Such data is preferably stored on the memory 120 and transmitted to the remote server when a suitable connection is established (e.g., through a Wi-Fi-enabled mobile electronic device connected to the preferred system 100 or according to a predefined preferred system 100 update schedule. However, the memory 120 can store any other data and the communication module 130 can send and/or receive any other relevant information to and/or from the remote server.

The processor 140 of the preferred system 100 is configured to selectively execute applications to control content rendered on the display 100, including the user-elected application and the vehicle identification application. The processor 140 is preferably arranged within the housing that also contains the memory 120 and the display 100, though the processor 140 can alternatively be remote from the display 100, such as arranged adjacent or physically coextensive with an ECM of the vehicle. The processor 140 is preferably coupled to memory and to the display 110 via a wired connection, such as a trace on a shared printed circuit board (PCB). However, the processor 140 can alternatively communicate with the memory 120 and/or display via a wireless or optical connection. Furthermore, the processor 140 can be physically coextensive with a processor of a mobile electronic device carried by the user. However, the processor 140 can be arranged in any other way, and the processor 140 can communicate with the memory 120 and/or display in any other way or according to any other protocol.

The processor 140 preferably handles transitions between applications and controls physical content rendered on the display 110. By selectively executing applications, the processor 140 can execute the vehicle identification application exclusively, the user-elected application exclusively, and/or the vehicle identification application and the user-elected application simultaneously. When executing the vehicle identification application, the processor 140 preferably accesses vehicle identification information stored on the memory 120 and handles rendering the vehicle identification information on the display 110. The processor 140 also preferably accesses necessary application and application-related data from the memory 120 when executing the user-elected application. The processor 140 can additionally or alternatively access relevant data directly from the remote server, such as via the communication module 130, to execute the application and select content to render on the display 110. The processor 140 preferably selectively executes the applications based upon the location of the vehicle, the proximity of the vehicle to a known or identified entity, an input from the user, an input from a known or identified entity outside of the vehicle, a user preference, a timer, a quality of a second local vehicle (e.g., child occupancy, a demographic of a driver, a driving record of a driver, the make and model of the second vehicle), or any other suitable trigger or input. A transition between two applications can be native to one or more applications, defined by the processor 140 outside of an application, set by the remote server, triggered by the user, or triggered by a second user or other entity outside of the vehicle. However, the transition between applications can be generated, defined, or set in any other way or by any other party.

In a variation of the preferred system 100 in which a transition between applications is triggered by a party external the preferred system 100 (e.g., the user, a second user, an external entity), the processor 140 preferably receives the trigger event through the communication module 130. In one example implementation, the communication module 130 includes a GPS sensor, and the processor 140 transitions to a toll application when the communicate module estimates that the vehicle is within a specified range of a tollbooth. In another example implementation, the communication module 130 includes an infrared (IR) sensor, and the processor 140 transitions to the vehicle identification application when a police officer points an IR remote at the communication module 130. In yet another example implementation, the communication module 130 includes an input region (e.g., a physical switch, a touch screen) arranged within the cabin of the vehicle and accessible by the user, and the processor 140 transitions between applications based upon a user interaction with the input region (e.g., flipping the switch, selecting a touch screen input region). However, the trigger can be any other type of input provided or generated by any suitable user, individual, or entity.

In one variation of the preferred system 100, the processor 140 executes the vehicle identification application that prompts the display 110 to render government-issued vehicle identification information. The display 110 preferably renders a government-issued license plate number when the processor 140 executes the vehicle identification application, though the display 110 can depict additional identification information, such as registration information, the name, permit, or driver's license number of a current occupant or driver, the license-issuing state, or a driving record of the current driver or owner of the vehicle. The license plate number or other identifier of the vehicle is preferably stored on a non-volatile, read-only portion of the memory 120 such that license plate number or other identifier cannot be changed once programmed onto the preferred system 100. Alternatively, the license plate number or other identifier can be protected by one or more firewalls, passwords, secure embedded systems (OS kernel, CPU, memory), passwords, cryptography schemes, etc. to substantially prevent illegal tampering with government-issued registration and identification information loaded onto the preferred system 100 that is mounted or otherwise coupled to the vehicle.

In this variation, the vehicle identification application can be national-, state-, or local government-specific such that various government entities can issue customized vehicle identification applications tailored to the rules, regulations, registration procedures, needs, etc. of each national, state, or local government. In one example, states can set different font sizes or typefaces, define placement of license plate numbers and registration tags, provide special templates or designs, or define any other formatting or stylistic property of visual content rendered on the display 110 through the vehicle identification application. In another example, state governments can set automatic registration protocols, such as how registration requests are routed to a department of motor vehicles server and how a digital registration "sticker" is transmitted back to the preferred system 100 as a vehicle identification information update. In a further example, local governments can set how or when vehicle identification information is installed on the preferred system 100, such as during manufacture or assembly of the preferred system 100, when the preferred system 100 is installed on a vehicle following delivery to a dealer, when the vehicle including the preferred system 100 is first registered at a DMV, when the vehicle including the preferred system 100 changes hands, and/or when an owner or user requests a license plate template change (e.g., standard to historic vehicle plate) or a change to vehicle registration (e.g., operational to non-op status, passenger to commercial vehicle status). In still another example, state governments can set triggers controlling transitions into the vehicle identification application, such as when the vehicle is within a preset range of an intersection, when the vehicle is within a preset range of a police officer, at specified intervals, when the vehicle is moving above a certain speed, when the vehicle is parked, when the vehicle is in a certain location, or given a trigger from a state-issued remote control device. However, national, state, and/or local governments can set any other relevant parameters of the vehicle identification application and/or the vehicle identification information rendered on the display 110 when the vehicle identification application executes. These parameters can also be modified or redefined over time, such as with updates for the vehicle identification application distributed to the preferred system 100 via the remote server.

In one variation of the preferred system 100, the user-elected application is an advertising application, wherein the display 110 renders the additional visual content that is an advertisement when the advertising application executes, as shown in FIG. 6A. In this variation, the user can select specific advertisements to render on the display 110. For example, the user who is a Giants baseball fan can select advertisements for tickets to Giants baseball games. In another example, the user that is a car dealership can select vehicle discounts and other dealership advertisements to be rendered on the display 110 when the vehicle is parked in a dealer lot. Additionally or alternatively, the user can elect certain advertising preferences or provide personal or demographic information that control which advertisements are rendered on the display 110. In one example, for the user who is a vegan, advertisements for fast food meat products are excluded from the advertising application executing on the preferred system 100 mounted to the vehicle owner by the user. In another example, whitewater rafting trips are rendered on the display 110 for the user who enjoys outdoor activities. In yet another example, for the user who is a country music fan, a playlist for a local country music radio station is rendered on the display 110. In this variation of the preferred system 100, the additional visual content is preferably targeted at a second user, individual, etc. outside of the vehicle. The second user, individual, etc. outside of the vehicle is also preferably within a field of view of the display 110 such that the advertisement is legible for the second user, individual, etc.

In this variation, the processor 140 can track advertisement exposure such that the user can be compensated for advertising products, goods, or services on the vehicle. In one example, the processor 140 tracks the amount of time an advertisement is displayed. In another example, the processor 140 is coupled to a camera and implements machine vision to identify and count the number of individuals who looked at display while the advertisement is rendered. In a further example, the preferred system 100 implements global positioning to track the number of vehicles within a field of view of the display 110 while the advertisement is rendered. In this variation, the display 110 time or amount of exposure of the advertisement is preferably used to calculate the amount of user compensation for the advertisement. Distribution of funds, prizes, discounts, coupons, or other forms of compensation are preferably handled by the remote server that accesses an account of the user, fleet manager, vehicle owner, etc. to deposit the compensation to the user or other suitable entity.

In another variation of the preferred system 100, the user-elected application is a road alert application, wherein the display 110 renders a road alert when the road alert application executes. In this variation, the display 110 preferably renders content substantially relevant to a second user outside of the vehicle, such as a second user who is following the vehicle in a second vehicle. The road alert application preferably informs the second user of upcoming road hazards, such as traffic conditions, accidents, potholes, construction, narrowed lanes, changes to a carpool lane or carpool lane restriction, onramps, or debris. In one example implementation, the user elects the road alert application in order to inform trailing vehicles of upcoming traffic or road conditions, which can improve driving safety of the user by improving current traffic-related knowledge of other drivers around the user. In another example implementation, the second user, who is following the vehicle in a second vehicle, requests installation of the road alert application on the preferred system 100 coupled to the vehicle. In this example implementation, the remote server preferably identifies the second user and/or the second vehicle that is/are proximal the user and/or the vehicle, such as through GPS tracking or short-range communications. The remote server then preferably checks the application request against preferences of the user and uploads the road alert application to the preferred system 100 when appropriate. Similarly, in an example implementation in which the road alert application is already installed on the preferred system 100, the second user can supply an input (e.g., via a smartphone) to trigger a transition into the road alert application or to select particular road-related information to render on the display 110, such as 'traffic conditions for the next five miles.' Therefore, individuals or entities outside of the vehicle can substantially control an application installed on the preferred system 100, a transition between two applications, and/or a selection of additional visual content rendered on the display 110 when the processor 140 executes the application.

In another variation of the preferred system 100, the user-elected application is a driving direction application, wherein the display 110 renders a driving direction when the driving direction application executes. The driving direction application is preferably similar to the road alert application described above, wherein the preferred system 100 displays information relevant to an individual outside of the vehicle. In this variation, the display 110 preferably depicts a driving direction for a second user driving behind the vehicle and within a field of view of the display 110 such that the second user does not need to remove his eyes from the road to view a driving direction. As described above, installation of the driving direction can be initiated by the user or requested by the second user. The second user also preferably requests directions to a destination, wherein the directions are handled by a remote server and pushed to the preferred system 100 for presentation to the second user. The preferred system 100 and/or the remote server can also identify additional vehicles proximal the second user and distribute driving directions across multiple vehicles followed by the second user over the course of the trip. However, the preferred system 100 can implement the user-elected application that is a driving direction application in any other suitable way.

In another variation of the preferred system 100, the user-elected application is a news application, wherein the display 110 renders a news alert when the news application executes. In this variation, the display 110 preferably renders local, state, national, or international current events, such as national political headlines or international economic headlines. Additionally or alternatively, the display 110 can render personal news or events related to the user or other individuals proximal the user, such as a news feeds, status update, message, or post sourced from a social network, blog, or other online service or network. For example, the display 110 can render a user status update that is "So excited—I just bought tickets for the Giants game tomorrow night," or "my friend Sammie just posted a new chili recipe to her cooking blog." In this variation, the display 110 can also render a visual pointer linking to the source of news content. For example, the display 110 can render a two-dimensional bar code, wherein an individual outside of the vehicle can user a smartphone implementing a camera to read the bar code and automatically access a news article, social network, blog, etc. from which the news content was sourced. Similarly, the communication module 130 can (wirelessly) output the pointer that is then accessed by a mobile electronic device carried by an individual outside of the vehicle to open the source of the news content.

In another variation of the preferred system 100, the user-elected application is an interstate trucking application, wherein the display 110 exhibits the status of trucking certifications for the vehicle that is a commercial truck traveling across a state border, as shown in FIG. 6C. In this variation, the preferred system 100 preferably interfaces with a local or global positioning system to track the location of the vehicle, such as when the vehicle crosses a state border and/or which roads the vehicle has covered. From this vehicle location information, the preferred system 100 and the remote server preferably cooperate to pay required fees and taxes, submit required vehicle information (e.g., vehicle gross weight) to relevant authorities (e.g., a department of motor vehicles), and to render visually on the display 110 the current status of vehicle certifications and payments. For example, an RFID tag included in the communication module 130 can trigger an RFID reader proximal a highway near a state border, wherein the trigger informs the remote server that the vehicle has crossed a state border, and wherein the remote server subsequently pushes relevant vehicle and payment information to an appropriate authority and the display 110 renders visual indicators of the certifications and payment. In this variation, the trucking application is preferably installed on the preferred system 100 by the user who is a fleet manager for a vehicle fleet including the vehicle such that the fleet manager can use the trucking application executing on a plurality of vehicles in the vehicle fleet to track and manage interstate trucking fees, payments, and certifications. However, in this variation, the trucking application can handle trucking certifications to the exclusion of application-specific or application-relevant visual content, wherein the preferred system 100 does not update visual content rendered on the display 110 when the processor 140 executes the trucking application. However, the preferred system 100 can function in any other way when executing the user-elected application that is a trucking application.

In another variation of the preferred system 100, the user-elected application is a messaging application, wherein the display 110 renders a personal message when the messaging application executes. In this variation, the user preferably generates the personal message, and the message is preferably text-based, though the message can additionally or alternatively include a static image or video. The user can generate the message on a message generation website accessible on a computer and supported by the remote server, through a message generation application executing on a mobile electronic device carried by the user and supported by the remote server, through an onboard vehicle voice control system coupled to the preferred system 100, or through any other suitable means. For example, the user can generate the message that is "Happy $17^{th}$ Birthday, Tom," "Go Giants," or "Acme Moving Services—call 800.555.9876." Alternatively, the user can select the message from a predefined set of messages or download the message from a website, online user profile, social network, etc. For example, the user can download a "How's my driving? sign," a "Baby on Board" sign, a digital bumper sticker, or a background image for the display 110. Similarly, the user can pull the message from a social network post, comment, or message. However, the user can generate or select any other message including any other content for rendering on the display 110.

In another variation of the preferred system 100, the user-elected application is a tollway application, wherein the preferred system 100 handles toll payments for the vehicle passing through a tollbooth or toll plaza. Like the interstate trucking application described above, the preferred system 100 executing the tollway application preferably monitors the location of the vehicle and/or communicates with a tollbooth or tollway to trigger a toll payment. The preferred system 100 and/or remote server preferably interface(s) with the tollbooth or a toll management server to pay for the vehicle toll, and once the toll has been paid, the display 110 preferably renders visual content that indicates that the toll is paid, as shown in FIGS. 2 and 6B. However, the tollway application can handle toll payments to the exclusion of visual content, wherein the preferred system 100 does not change or update visual content rendered on the display 110 when the tollway application executes. However, the tollway application can function in any other way.

In another variation of the preferred system 100, the user-elected application is a gaming application, wherein the display 110 renders gaming content when the gaming application executes. In this variation, the preferred system 100 preferably enables gaming between the user and any other individual proximal the user. For example, the user in the vehicle can play a game with a second user in a second vehicle when the second vehicle is following the first vehicle, the user is facing a preferred system 100 installed on the front of the second vehicle, and the second user is facing the preferred system 100 installed on the back of the vehicle. In this example, the user can control the output of a second display on the second vehicle via a handheld electronic device, and the second user can control the output of the display 110 on the vehicle through a second handheld electronic device. Therefore, the preferred system 100, installed on a plurality of vehicles, can enable a gaming platform or gaming interface for users occupying different but nearby vehicles.

The applications configured to execute on the preferred system 100 are preferably created by third-party developers and hosted on the remote server such that the user can preview applications, select relevant applications, and install the relevant applications on the preferred system 100 for subsequent use. The remote server preferably provides a software development kit (SDK) and/or hosts an application programming interface (API) to support application creation and development by the third-party developers. The third-party developers can represent government agencies (e.g., a state DMV), private institutions (e.g., a private toll plaza on a private highway, a retailer), or independent users. However, the preferred system 100 and/or remote server can function in any other way to support development of applications that enable additional functionalities for the preferred system 100.

The preferred system 100 is preferably electrically powered. The preferred system 100 can therefore include a battery, a solar cell, or any other energy storage or an energy harvesting device. Alternatively the preferably system can tap into a power source integral with the vehicle, such as an electrical system of the vehicle. However, the preferred system 100 can be powered in any other way and be coupled or include any other power source, storage, and harvesting device.

2. First Preferred Method

Figure 3:
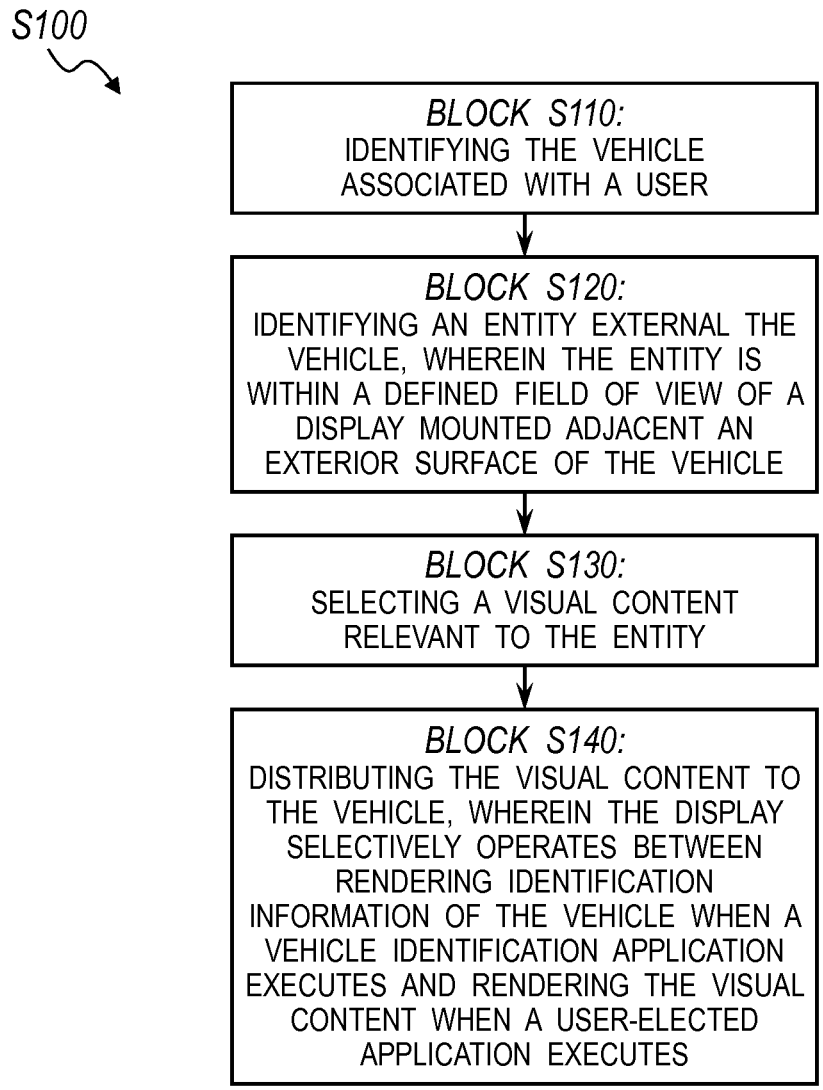
FIG. 3 is a flowchart representation of a first method of a preferred embodiment.

As shown in FIG. 3, a first preferred method S100 for rendering content on a vehicle includes: identifying the vehicle associated with a user in Block S110; identifying an entity external the vehicle, wherein the entity is within a defined field of view of a display mounted adjacent an exterior surface of the vehicle in Block S120; selecting a visual content relevant to the entity in Block S130; and distributing the visual content to the vehicle in Block S140, wherein the display selectively operates between rendering identification information of the vehicle when a vehicle identification application executes and rendering the visual content when a user-elected application executes.

Figure 7:
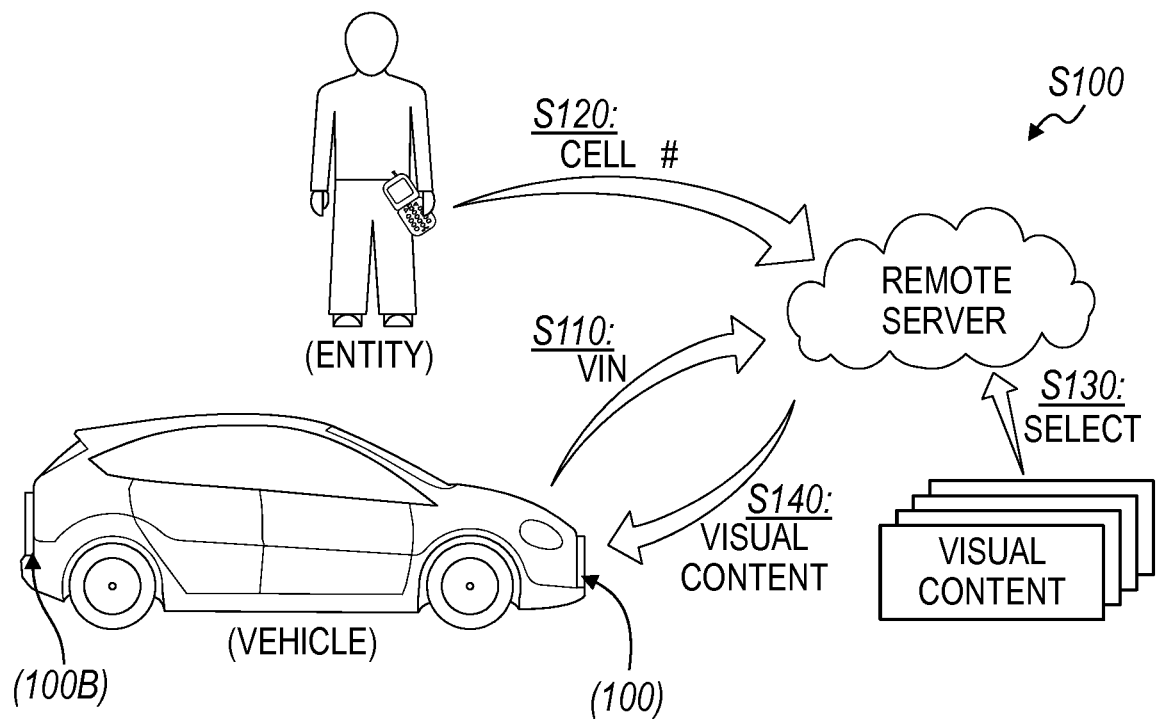
FIG. 7 is a flowchart representation of a variation of the first preferred method.

As shown in FIG. 7, the first preferred method S100 is preferably implemented by the remote server in communication with the preferred system 100 described above, and the display of the first preferred method S100 preferably includes the preferred system 100. The first preferred method S100 preferably functions to enable visual communication with the entity via a display mounted to the vehicle that is proximal the entity, wherein visual communications are selected based upon relevance to the entity, and wherein the display mounted to the vehicle also renders identification information of the vehicle.

Block S100 of the first preferred method S100 recites identifying the vehicle associated with the user. The remote server preferably receives identifying information from the display by communicating with the display directly, such as through a Wi-Fi, RFID, or cellular connection enabled by a wireless communication module within the display. Alternatively, the remote server can communicate with the display indirectly, such as through a mobile electronic device coupled to the display, as described above. The remote server preferably accesses a unique key, address, or identifier of the vehicle, such as an encrypted and protected license plate number stored in non-volatile memory within the display. However, the vehicle can additionally or alternatively be identified by any of the location of the vehicle, an owner or operator of the vehicle, a transportation or trucking certification, a vehicle operator or owner profile, or any other suitable identifier. The identity of the vehicle can also be used to source information pertaining to an owner or operator of the vehicle, such as by accessing a user demographic, interest, or preference stored on a social network.

The first preferred method S100 can additionally or alternatively collect the position or location of the vehicle, such as by communicating with a GPS module integrated into the vehicle, into the display, or into a mobile electronic device (e.g., smartphone) in communication with the vehicle and/or the display.

Once the first preferred method S100 identifies the vehicle, any of a list of applications enabled on the display, display preferences of the user, vehicle data, a vehicle profile, a user profile, etc. can be collected to inform the selection of visual content in Block S130. However, Block S110 can function in any other way.

Block S120 of the first preferred method S100 recites identifying an entity external the vehicle, wherein the entity is within a defined field of view of the display mounted adjacent the exterior surface of the vehicle. The entity can be any of a second user in a second vehicle proximal the vehicle and/or the user, a law enforcement officer, a government agent or employee, a tollbooth or toll plaza, a parking kiosk, a commercial vehicle weigh station, a ferry kiosk, or any other suitable entity, agency, group, or individual. For the entity that is not human, the entity preferably includes an optical sensor, such as a camera, configured to optically resolve the visual content rendered on the display. However, for the entity who is human, the preferred method preferably includes determining the location, an identity, a demographic, or any other relevant characteristic or quality of the entity that can inform the selection of the visual content in Block S130.

Figure 4:
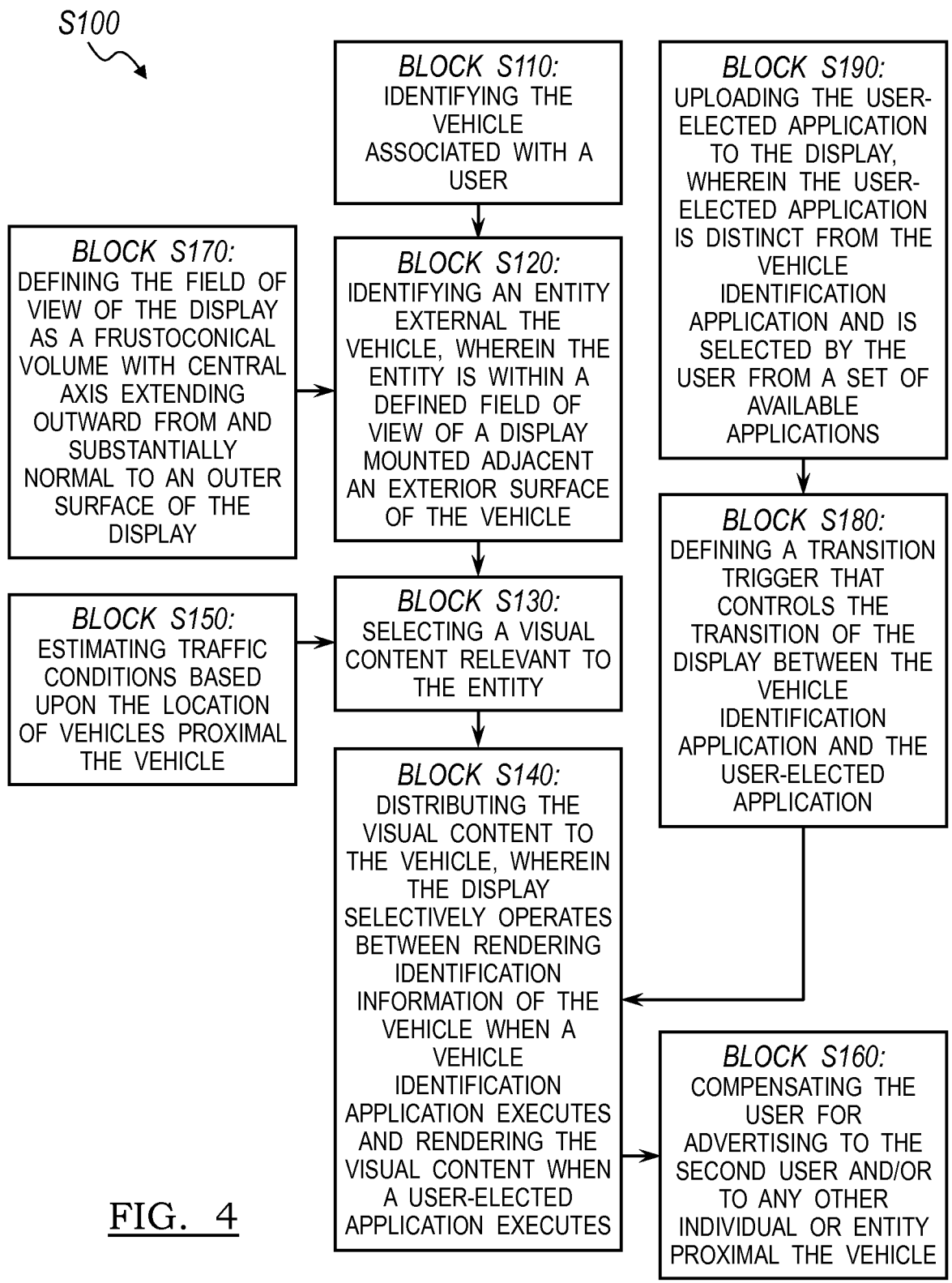
FIG. 4 is a flowchart representation of one variation of the first preferred method.

Identifying the entity external the vehicle in Block S120 preferably includes identifying the entity that is local or substantially proximal the vehicle, such as within a field of view of the display. As shown in FIG. 4, the first preferred method S100 can therefore also include Block S170, which recites defining the field of view of the display as a frusto-conical volume with central axis extending outward from and substantially normal to an outer surface of the display. The field of view is preferably dependent upon a suitable viewing angle of the display, ambient light, backlight level of the display, and/or a distance over which the entity is expected to visually resolve a feature, image, letter, number, word, etc. rendered on the display. Block S120 preferably identifies the entity that is at least partially contained with the defined field of view of the display such that the entity can resolve the visual content that is rendered on the display.

Block S130 of the first preferred method S100 recites selecting the visual content relevant to the entity. The visual content is preferably selected from a content database maintained by the remote server implementing the first preferred method S100. The database can includes static content, such as toll payment profiles, standard bumper stickers, or advertisements, as described above. Alternatively, the database can include dynamic content, such as professional sports statistics, game play-through, news, user social network posts or messages, or driving directions, as described above.

In one variation of the first preferred method S100, the entity is a second human user occupying a second vehicle. In one example implementation, Block S130 includes selecting visual content that is an advertisement relevant to the second user, such as based upon a location, interest, demographic (e.g., age, ethnicity, education level), recent purchase, purchase history, social network profile or feed, etc. of the second user. In this example implementation, the visual content is preferably rendered on the display in Block S140 when a user-elected application that is an advertisement application executes, as described above. Furthermore, in this example implementation and as shown in FIG. 4, the first preferred method S100 can also include Block S160, which recites compensating the user for advertising to the second user and/or to any other individual or entity proximal the vehicle. For example, the user associated with vehicle can be compensated monetarily, with a prize, with a coupon, with a discount, with a raffle or lottery entry, or via any other reward mechanism for advertising to the second user. Block S160 can also include determining a magnitude of exposure of the visual content to the second user and/or to additional individuals proximal the vehicle. For example, the first preferred method S100 can track individuals or other vehicles near the vehicle by implementing GPS or by implementing object recognition to identify individuals or other vehicles in an image captured by a camera mounted to the vehicle. However, the visual content can be any other type of advertisement and the user can be compensated for advertisements according to any other method or schema.

In another example implementation, Block S130 includes selecting visual content that is a frame of a game played between the user and the second user. In this example implementation, the visual content is preferably rendered on the display in Block S140 when a user-elected application that is a gaming application executes, as described above.

In another example implementation, Block S130 includes selecting the visual content that is related to a current action of the user. For example, the visual content can be an upcoming traffic alert targeted to the second user who is driving behind the vehicle, as described above. In this example implementation and as shown in FIG. 4, the preferred method preferably also includes Block S150, which recites estimating traffic conditions based upon the location of vehicles proximal the vehicle, wherein the visual content selected in Block S130 accounts for the traffic conditions. The visual content can additionally or alternatively be an predicted or anticipated future traffic condition.

In another example implementation, Block S130 includes selecting the visual content based upon a request from the user. In one example, the visual content is one or more driving directions requested by the second user and rendered on the display to the benefit of the second user when the user-elected application that is a driving direction application executes, as described above. In another example, the visual content is a local radio station playlist requested by the second user. In this example implementation, the request from the second user is preferably checked against a preference associated with the vehicle, wherein the visual content is only selected when the visual content conforms to the preference. Furthermore, the preference is preferably set by the user who is an owner, operator, or fleet manager of the vehicle.

In another variation of the first preferred method S100, the entity is a non-human entity. In one example implementation, the entity is a tollbooth or toll plaza, wherein the visual content is selected based upon payment of a toll fee on behalf of the vehicle, such as from a toll payment account of the user, as described above. In this example implementation, the visual content preferably indicates whether or not the toll fee has been paid for the vehicle once the vehicle passes through the tollbooth or toll plaza. The visual content can therefore aid at least one of an automated toll enforcement service and a law enforcement officer near the tollbooth in quickly identifying any wrongdoing on the part of an operator of the vehicle. In this example implementation, the first preferred method S100 and the remote server preferably cooperate to handle toll payment on behalf of the user and/or vehicle in addition to displaying vehicle toll payment status.

In another example implementation in which the vehicle is a commercial truck and the entity is a weigh station or a state border, the visual content is selected based upon a certification status of the vehicle, as described above. In this example implementation, the first preferred method S100 preferably handles payment of any interstate trucking fees on behalf of the vehicle in addition to displaying certification status and/or certification payment status.

However, the entity can be any other user, individual, group, agency, etc., and any other suitable visual content can be selected in Block S130, such as any one of more of a personal message, a game, a news alert, a public announcement, a local radio playlist, a driving direction, etc.

Block S140 of the first preferred method S100 recites distributing the visual content to the vehicle, wherein the display selectively operates between rendering identification information of the vehicle when the vehicle identification application executes and rendering the visual content when the user-elected application executes. As described above, the vehicle identification information is preferably a license plate number of the vehicle, though the vehicle identification information can additionally or alternatively be a VIN of the vehicle, a driver's license number of a vehicle operator, a name or other identity of the user and/or operator of the vehicle, registration information of the vehicle, or any other relevant vehicle- or user-related information. As described above, the remote server implementing the first preferred method S100 preferably transmits the visual content directly to the display via a wireless connection. Alternatively, the visual content can be uploaded to the display via a mobile electronic device wired or wirelessly coupled to the display.

As shown in FIG. 4, the first preferred method S100 can also include Block S180, which recites defining a transition trigger that controls the transition of the display between the vehicle identification application and the user-elected application. As described above, the transition trigger can be based upon the location of the vehicle, the proximity of the vehicle to the entity, an input from the user, an input from the entity, a user preference, a timer, a quality of a second local vehicle (e.g., child occupancy, a demographic of a driver, the make and model of the second vehicle), or any other suitable trigger or input. The transition defined in Block S180 can be sent to the vehicle in Block S140 as application data native to one or more applications, a processor setting, a remote server setting, or any other data or setting structure. However, a transition between applications can be generated, defined, set, transmitted, and/or implemented in any other way or by any other party.

As shown in FIG. 4, the first preferred method S100 can also include Block S190, which recites uploading the user-elected application to the display, wherein the user-elected application is distinct from the vehicle identification application and is selected by the user from a set of available applications. As described above, the remote server implementing the first preferred method S100 preferably includes an application database that stores a plurality of applications configured to execute on the display, wherein the display preferably includes the preferred system 100. The user who is associated with the vehicle, such as an owner, operator, or fleet manager, preferably selects one or more applications from the database, wherein Block S190 uploads the one or more applications to the display based upon the user selection.

As described above, the first preferred preferably also includes supporting an SDK and/or an API to enable third-party development of applications that improve the functionality of the display in the second preferred method S200 (and the preferred system 100). However, the second preferred method S200 can include and other Blocks and fulfill any other functionality.

3. Second Preferred Method

Figure 5:
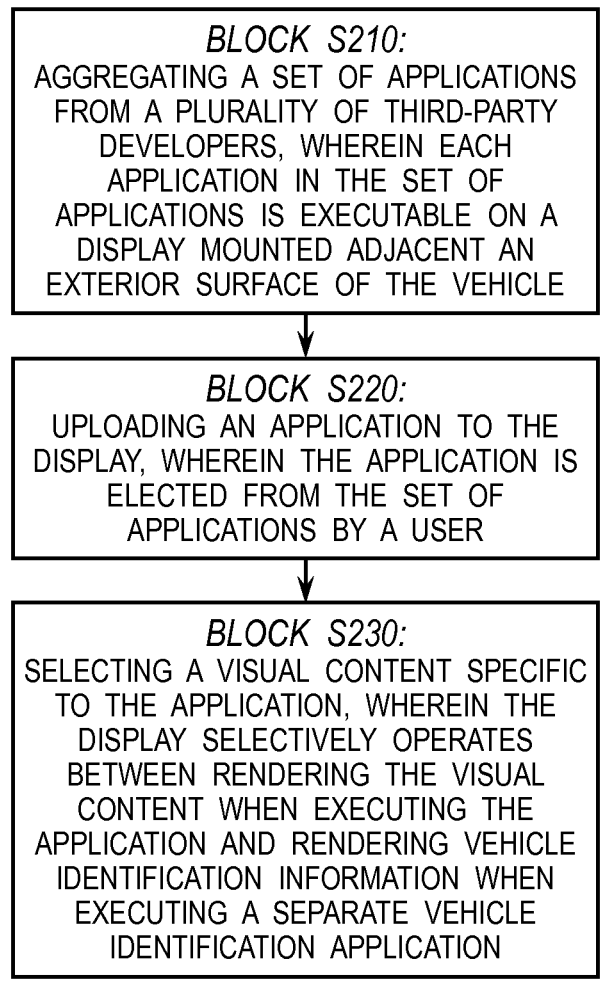
FIG. 5 is a flowchart representation of the second preferred method.

As shown in FIG. 5, a second preferred method S200 for rendering content on a vehicle includes: aggregating a set of applications from a plurality of third-party developers, wherein each application in the set of applications is executable on a display mounted adjacent an exterior surface of the vehicle in Block S210; uploading an application to the display, wherein the application is elected from the set of applications by a user in Block S220; and selecting a visual content specific to the application, wherein the display selectively operates between rendering the visual content when executing the application and rendering vehicle identification information when executing a separate vehicle identification application in Block S230.

The second preferred method S200 is preferably implemented by the remote server of the preferred system 100 and/or the first preferred method S100 described above. The second preferred method S200 preferably functions to store applications executable on the preferred system 100, to distribute a selected application to the preferred system 100, and to select visual content to be rendered on the preferred system 100.

Block S210 of the second preferred method S200 recites aggregating a set of applications from a plurality of third-party developers, wherein each application in the set of applications is executable on a display mounted adjacent an exterior surface of the vehicle. The set of applications is preferably provided by one or more third-party developers, wherein each of at least a subset of applications provides a unique functionality when executing on the preferred system 100. Block S210 is therefore preferably enabled by an SDK and/or API made available to third-party developers via the second preferred method S200.

Block S220 of the second preferred method S200 recites uploading the application to the display, wherein the user elects the application from the set of applications. Block S220 therefore preferably functions as Block S190 described above.

Block S230 of the second preferred method S200 recites selecting the visual content specific to the application, wherein the display selectively operates between rendering the visual content when executing the application and rendering vehicle identification information when executing a separate vehicle identification application. Block S230 therefore preferably functions as Block S130 described above.

The processor 140 is preferably coupled to the vehicle speed sensor 120. As mentioned above, the speed determined by the vehicle speed sensor 120 may be the actual speed of the vehicle or may alternatively be the speed of the vehicle relative to another object (for example, a neighboring vehicle). The processor 140 preferably selects the operational mode of the preferred system 100 based on the speed and power state of the vehicle. However, a device other than the processor, such as the onboard computer of the vehicle, a law enforcement officer, a second processor connected to a remote server, or any other suitable device or institution may select the operational mode of the preferred system 100. The processor 140 preferably operates the display 110 in the first and second operational modes when the vehicle is on, and the processor preferably operates the display 110 in the third operational mode when the vehicle is off. The vehicle is preferably considered "on" when the driver turns any portion of the vehicle on. In many cars, there is a plurality of "on" states, for example, a first "on" state in which basic functionality, such as opening and closing windows, is allowed; a second "on" state in which more advanced and/or higher-power functionality, such as ventilation systems or the sound system, is allowed; and a third "on" state in which the vehicle may be driven (or, in other words, the ignition is on). The vehicle may be considered "off" otherwise. In the "off" state, certain portions of the vehicle may still be "on", for example, security sensors, key proximity sensors (such as keyless entry), or any other type of substantially-low-power functionality. Alternatively, the vehicle may be considered "on" when the ignition is on and considered "off" when the ignition is off, regardless of any other functionality that the vehicle may provide to the driver. Yet alternatively, the vehicle may be considered "on" when the presence of a person is detected within the vehicle and "off" when there is no one within the vehicle. The vehicle may also be considered off when the emergency brake or transmission parking brake of the vehicle is engaged, regardless of the state of the ignition or presence of a person within the vehicle. However, the vehicle may be considered "on" and "off" using any other suitable criteria. The processor 140 preferably operates the display 110 in the first operational mode when the vehicle is at a first speed and preferably operates the display 110 in the second operational mode when the vehicle is at a second speed lower than the first speed. The second speed is preferably substantially zero speed, or substantially close to zero speed. This allows for identification and/or registration information of the vehicle to be substantially visible while the vehicle is in motion (the first speed), as shown in FIG. 1. This allows any party external to the vehicle to visually access the information rendered on the display 110 in a manner similar to that used to visually access information on a static (or stamped) license plate. In one variation, the processor 140 operates the display 110 in the second operational mode and renders the second content on the display 110 when the vehicle is on and at the second speed, wherein the second speed is preferably zero speed or a substantially slow speed, such as when the vehicle is moving slowly through heavy traffic. Because the message depicted in the second mode takes up a portion of the display area of the display 110, the identification and/or registration information also depicted may consume a smaller portion of the display area in the second operational mode as compared to the first operational mode, as shown in FIG. 2. Because the identification and registration information is depicted in a is smaller size on the display 110 when a message is displayed concurrently with the vehicle information, the visibility of the identification and registration information may be less in the second operational mode than in the first operational mode. Alternatively, the identification and/or registration information rendered on the display 110 in the second operational mode may be of the same or similar format (for example, size and layout) as in the first mode, but the message may be rendered on the display 110 to overlap the identification and/or registration information. This may also result in reduced visibility of the identification and/or registration information of the vehicle. Therefore, the message may be displayed only under such conditions as when the vehicle is stopped or nearly stopped so that decreased visibility of the identification and/or registration information does not occur when the vehicle is moving at a substantial speed; however, the additional functionality of displaying the message when the vehicle is at the second speed still remains. Additionally, the message may provide an undesired distraction for a party outside of the vehicle while the vehicle is in motion, and thus, by only displaying the message while the vehicle is stopped or nearly stopped, the possibility of distraction may be substantially reduced. However, the processor 140 may alternatively operate the display 110 in the first and second operational modes at any other suitable speed arrangement. In a variation of this, the preferred system 100 may enhance legibility of the information for a party outside of the vehicle by horizontally mirroring content rendered on the display 110 when the display 110 is mounted on the front exterior of the vehicle; in this variation, content rendered on the display may be read in the correct orientation by a party viewing the display 110 in a rearview or side mirror of a second vehicle located ahead of the vehicle. However, the processor may render content on the display 110 by any other means or arrangement such that distraction caused by the display 110 is reduced and legibility of the displayed content is improved.

The systems and methods of the preferred embodiment can be embodied and/or implemented at least in part as a machine configured to receive a computer-readable medium storing computer-readable instructions. The instructions are preferably executed by computer-executable components preferably integrated with the application, applet, host, server, network, website, communication service, communication interface, hardware/firmware/software elements of a user computer or mobile electronic device, or any suitable combination thereof. Other systems and methods of the preferred embodiment can be embodied and/or implemented at least in part as a machine configured to receive a computer-readable medium storing computer-readable instructions. The instructions are preferably executed by computer-executable components preferably integrated by computer-executable components preferably integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but any suitable dedicated hardware device can (alternatively or additionally) execute the instructions.

As a person skilled in the art will recognize from the previous detailed description and from the figures and claims, modifications and changes can be made to the preferred embodiments of the invention without departing from the scope of this invention as defined in the following claims.

We claim:

1. A method for rendering content on a vehicle, the method comprising:

identifying the vehicle associated with a user through wireless communication between the vehicle and the processor;

selecting a primary digital visual content uniquely associated with the vehicle in response to execution of a vehicle identification application;

selectively mounting a display system to at least one of a front surface, a back surface, and side surfaces of the vehicle;

rendering the primary digital visual content on a primary region of the display system;

defining a field of view of the display system;

determining an entity at least partially contained within the defined field of view of the display system is a non-human entity;

identifying information to be processed by the non-human entity and selecting a secondary digital visual content containing the information to be processed by the non-human entity using an optical sensor configured to optically resolve the secondary digital visual content rendered on the display system;

setting a first set of display rules for selectively rendering the primary digital visual content and the secondary digital visual content on the display system;

uploading the first set of display rules, the primary digital visual content, and the secondary digital visual content to the display system; and dynamically rendering the secondary digital visual content on a secondary region of the display system to be processed by the non-human entity.

2. The method of claim 1, further comprising defining the field of view of the display system as a frustoconical volume with central axis extending outward from and substantially normal to an outer surface of the display system.

3. The method of claim 1, further comprising uploading the user-elected application to the display system, the user-elected application distinct from the vehicle identification application and selected by the user from a set of available applications.

4. The method of claim 1, wherein dynamically rendering the secondary digital visual content comprises selecting the secondary digital visual content based upon the location of the vehicle.

5. The method of claim 1, wherein dynamically rendering the secondary digital visual content to the vehicle comprises distributing the secondary digital visual content to the vehicle in response to receiving a request from the entity, the request substantially conforming to a preference associated with the vehicle.

6. The method of claim 5, wherein selecting the secondary digital visual content comprises accessing the preference, the preference defined by the user.

7. The method of claim 1, wherein the secondary digital visual content comprises an advertisement targeted to the entity, the entity comprising a second user occupying a second vehicle proximal the vehicle.

8. The method of claim 7, wherein identifying the entity comprises determining a demographic of the second user, wherein dynamically rendering the secondary digital visual content comprises selecting an advertisement relevant to the demographic of the second user.

9. The method of claim 1, further comprising compensating the user for the secondary digital visual content rendered on the display system, wherein compensating the user comprises determining a magnitude of exposure of the secondary digital visual content to additional individuals proximal the vehicle, the user compensated based upon the magnitude of exposure of the secondary digital visual content.

10. The method of claim 1, further comprising estimating a traffic condition based upon the location of vehicles proximal the vehicle, wherein dynamically rendering the secondary digital visual content to the display system comprises distributing to the display system a traffic alert of a traffic condition proximal the vehicle.

11. The method of claim 10, wherein dynamically rendering the secondary digital visual content to the display system comprises distributing to the vehicle an anticipated future traffic condition and a driving suggestion for the second user.

12. The method of claim 1, wherein dynamically rendering the secondary digital visual content comprises selecting the visual content from the list consisting of a personal message, a game, a news alert, a public announcement, a local radio playlist, and a driving direction.

13. A method for rendering content on a vehicle, the method comprising:
at a processor remote from the vehicle, aggregating a set of applications from a set of third-party developers, each application in the set of applications executable on a display system mounted adjacent an exterior surface of the vehicle;
uploading a particular application from the processor remote from the vehicle to the display system, the particular application elected from the set of applications by a user;
at a speed sensor coupled to the vehicle, detecting a speed of the vehicle;
at the display system, selecting a visual content specific to the application;
wherein the display system renders the visual content in response to a first particular speed;
wherein the display system renders a horizontally-mirrored image of the visual content in response to a second particular speed different from the first particular speed;
distributing the visual content to the vehicle, wherein the display system selectively operates between rendering the visual content when executing the particular application and rendering vehicle identification information when executing a distinct vehicle identification application in the set of applications; and
selectively rendering the visual content, a horizontally-mirrored image of the visual content, and the vehicle identification information on the display system.

14. The system of claim 13, wherein selecting the visual content comprises selecting visual content comprising an advertisement targeted to a second user occupying a second vehicle proximal the vehicle.

15. The method of claim 1 further comprising distributing the primary visual content and the secondary visual content to the display system according to the first set of display rules.

16. The method of claim 1, wherein selecting secondary digital visual content associated with the user comprises selecting a digital trucking certificate for the vehicle in response to execution of an interstate trucking application on the display system.

17. The method of claim 16, further comprising transmitting a gross weight of the vehicle to the entity in response detection of the vehicle within a proximity to a particular location, the entity comprising a remote third party; and wherein selecting the digital trucking certificate comprises selecting a vehicle status certification.

18. The method of claim 1, further comprising transmitting a fee payment to the entity; wherein dynamically rendering the secondary digital visual content comprises selecting the vehicle status certification and a certification of payment.

19. The method of claim 1, wherein dynamically rendering the secondary digital visual content comprises selecting a driving direction for the entity in response to execution of a navigation application by a computing device associated with the entity.

20. A method for rendering content on a vehicle, the method comprising:
at a speed sensor coupled to the vehicle, determining a speed of the vehicle based on an output of the vehicle speed sensor;
at a processor remote the vehicle, selecting a primary digital visual content associated with the vehicle in response to execution of a vehicle identification application at the processor;
at the processor, selecting a secondary digital visual content associated with a user proximal the vehicle in response to execution of a user-elected application at the processor;
identifying an entity external the vehicle, the entity within a defined field of view of the camera and the display mounted to a forward-facing exterior surface of the vehicle;
at the processor, selecting a tertiary digital visual content in response to execution of an entity-elected application elected by the entity; and
selectively rendering the tertiary visual content, the primary digital visual content, and the secondary digital visual content on the display in response to the entity proximal the vehicle;
wherein the display renders the primary digital visual content in response to a determined speed substantially equal a threshold speed;
wherein the display renders a horizontally-mirrored image of the primary visual content on the display in response to a second determined speed of the vehicle different from the threshold speed; and
wherein the display selectively renders the secondary digital visual content, and the tertiary visual content in response to a third determined speed of the vehicle different from the threshold speed and the second determined speed.

21. The method of claim 1, further comprising using a camera to detect an image including the non-human entity, wherein the step of identifying the non-human entity includes implementing object recognition to process the image and identify the non-human entity at least partially contained within the defined field of view of the display system.

22. The method of claim 1, further comprising mounting the display system to the front surface of the vehicle.

* * * * *